United States Patent
Yarbrough et al.

(10) Patent No.: US 10,422,316 B2
(45) Date of Patent: Sep. 24, 2019

(54) PRE-CURED ROTOR BLADE COMPONENTS HAVING AREAS OF VARIABLE STIFFNESS

(71) Applicant: General Electric Company, Schenectady, NY (US)

(72) Inventors: Aaron A. Yarbrough, Greenville, SC (US); Christopher Daniel Caruso, Greenville, SC (US)

(73) Assignee: General Electric Company, Schenectady, NY (US)

( * ) Notice: Subject to any disclaimer, the term of this patent is extended or adjusted under 35 U.S.C. 154(b) by 490 days.

(21) Appl. No.: 15/251,048

(22) Filed: Aug. 30, 2016

(65) Prior Publication Data

US 2018/0058422 A1  Mar. 1, 2018

(51) Int. Cl.
| | |
|---|---|
| F03D 1/06 | (2006.01) |
| B29C 70/44 | (2006.01) |
| B29C 70/50 | (2006.01) |
| B32B 5/02 | (2006.01) |
| B29D 99/00 | (2010.01) |
| B29K 105/08 | (2006.01) |
| B29L 31/08 | (2006.01) |

(52) U.S. Cl.
CPC .......... *F03D 1/0675* (2013.01); *B29C 70/443* (2013.01); *B29C 70/504* (2013.01); *B29D 99/0028* (2013.01); *B32B 5/02* (2013.01); *B29K 2105/089* (2013.01); *B29L 2031/085* (2013.01); *B32B 2603/00* (2013.01); *Y02E 10/721* (2013.01)

(58) Field of Classification Search
CPC ...... F03D 1/0675; B29D 99/0028; B23B 5/02
USPC .......................................................... 264/257
See application file for complete search history.

(56) References Cited

U.S. PATENT DOCUMENTS

| | | | |
|---|---|---|---|
| 6,264,877 B1 | 7/2001 | Pallu De La Barriere | |
| 7,473,385 B2 | 1/2009 | Stiesdal et al. | |
| 7,625,185 B2 | 12/2009 | Wobben | |
| 7,758,313 B2 * | 7/2010 | Eyb | F03D 1/065 416/226 |
| 8,079,818 B2 | 12/2011 | Burchardt et al. | |
| 8,142,162 B2 | 3/2012 | Godsk et al. | |

(Continued)

FOREIGN PATENT DOCUMENTS

| | | |
|---|---|---|
| CA | 2526407 | 11/2012 |
| CN | 201155423 Y | 11/2008 |

(Continued)

OTHER PUBLICATIONS

U.S. Appl. No. 14/754,768, filed Jun. 30, 2015.
U.S. Appl. No. 14/754,754, filed Aug. 18, 2015.

*Primary Examiner* — Woody A Lee, Jr.
*Assistant Examiner* — Sabbir Hasan
(74) *Attorney, Agent, or Firm* — Dority & Manning, P.A.

(57) ABSTRACT

The present disclosure is directed to a rotor blade component for a wind turbine. The rotor blade component includes a plurality of pre-cured members arranged in one or more layers. Each of the pre-cured members is constructed of a plurality of fiber materials cured together via a resin material having a first stiffness and at least additional material having a second stiffness. Further, the second stiffness is lower than the first stiffness. As such, the additional low-stiffness material is cured within the resin material so as to increase flexibility of the pre-cured members.

16 Claims, 4 Drawing Sheets

(56) References Cited

U.S. PATENT DOCUMENTS

| | | |
|---|---|---|
| 8,157,939 B2 | 4/2012 | Stiesdal |
| 8,168,027 B2 | 5/2012 | Jacobsen et al. |
| 8,172,538 B2 | 5/2012 | Hancock et al. |
| 8,297,932 B2 | 10/2012 | Arocena De La Rua et al. |
| 8,317,479 B2 | 11/2012 | Vronsky et al. |
| 8,348,622 B2 | 1/2013 | Bech |
| 8,353,674 B2 | 1/2013 | Bech |
| 8,506,258 B2 | 8/2013 | Baker et al. |
| 8,511,996 B2 | 8/2013 | Llorente Gonzalez et al. |
| 8,540,491 B2 | 9/2013 | Gruhn et al. |
| 8,657,581 B2 | 2/2014 | Pilpel et al. |
| 8,673,106 B1 | 3/2014 | Jolley et al. |
| 8,747,098 B1 | 6/2014 | Johnson et al. |
| 8,826,534 B2 | 9/2014 | Cappelli et al. |
| 8,961,142 B2 | 2/2015 | Wansink |
| 8,992,813 B2 | 3/2015 | Robbins et al. |
| 2009/0017573 A1 | 1/2009 | Mouli |
| 2009/0148300 A1 | 6/2009 | Driver et al. |
| 2010/0098549 A1 | 4/2010 | Mironov |
| 2011/0031758 A1 | 2/2011 | Mitsuoka et al. |
| 2011/0037191 A1 | 2/2011 | Stiesdal |
| 2011/0045276 A1 | 2/2011 | Grove-Nielsen |
| 2011/0318186 A1 | 12/2011 | Kristensen et al. |
| 2012/0039720 A1 | 2/2012 | Bech |
| 2012/0067515 A1 | 3/2012 | Dahl et al. |
| 2012/0180582 A1 | 7/2012 | Piasecki |
| 2012/0230830 A1 | 9/2012 | Lind et al. |
| 2013/0022466 A1 | 1/2013 | Laurberg |
| 2013/0108453 A1 | 5/2013 | Baker et al. |
| 2013/0129518 A1 | 5/2013 | Hayden et al. |
| 2013/0149166 A1 | 6/2013 | Schibsbye |
| 2013/0164133 A1 | 6/2013 | Grove-Nielsen |
| 2013/0195661 A1 | 8/2013 | Lind et al. |
| 2013/0237356 A1 | 9/2013 | Pasch |
| 2013/0333823 A1 | 12/2013 | Hedges et al. |
| 2014/0003956 A1 | 1/2014 | Lull et al. |
| 2014/0023513 A1 | 1/2014 | Johnson et al. |
| 2014/0030094 A1 | 1/2014 | Dahl et al. |
| 2014/0119936 A1 | 5/2014 | Dahl et al. |
| 2014/0271217 A1* | 9/2014 | Baker ............... F03D 1/0633 416/226 |
| 2014/0295187 A1 | 10/2014 | Jacobsen et al. |
| 2015/0023799 A1* | 1/2015 | Wetzel ............... F03D 1/0675 416/226 |
| 2015/0224759 A1 | 8/2015 | Boon |
| 2015/0224760 A1 | 8/2015 | Eyb et al. |

FOREIGN PATENT DOCUMENTS

| | | |
|---|---|---|
| CN | 100476200 C | 4/2009 |
| CN | 101725481 A | 6/2010 |
| CN | 101906251 A | 12/2010 |
| CN | 101302302 B | 2/2011 |
| CN | 101194102 B | 4/2012 |
| CN | 102459881 A | 5/2012 |
| CN | 102705157 A | 10/2012 |
| DE | 102011051172 A1 | 12/2012 |
| DE | 102012219224 B3 | 3/2014 |
| DK | 201270816 A | 1/2014 |
| DK | 201270818 A | 1/2014 |
| EP | 2113373 B1 | 1/2011 |
| EP | 2255957 B1 | 7/2013 |
| EP | 2679804 A1 | 1/2014 |
| EP | 2679806 A1 | 1/2014 |
| EP | 2682256 A1 | 1/2014 |
| GB | 2451192 A | 1/2009 |
| GB | 2455044 A | 6/2009 |
| JP | 2007092716 A | 4/2007 |
| JP | 3930200 B2 | 6/2007 |
| JP | 2011032987 A | 2/2011 |
| JP | 2011038518 A | 2/2011 |
| JP | 5439412 B2 | 3/2014 |
| WO | WO 03/082551 A1 | 10/2003 |
| WO | WO 2010/025830 A2 | 3/2010 |
| WO | WO 2010/057502 A3 | 5/2010 |
| WO | WO 2011/088835 A2 | 7/2011 |
| WO | WO 2012/042261 A1 | 4/2012 |
| WO | WO 2012/140039 A2 | 10/2012 |
| WO | WO 2013/007351 A1 | 1/2013 |
| WO | WO 2013/060582 A1 | 5/2013 |
| WO | WO 2013/178228 A1 | 12/2013 |
| WO | WO 2014/044280 A1 | 3/2014 |
| WO | WO 2014/049354 A1 | 4/2014 |
| WO | WO 2014/063944 A1 | 5/2014 |
| WO | WO 2015/015202 A1 | 2/2015 |
| WO | WO 2015/070876 A1 | 5/2015 |

\* cited by examiner

PRE-CURED ROTOR BLADE COMPONENTS HAVING AREAS OF VARIABLE STIFFNESS

FIELD OF THE INVENTION

The present subject matter relates generally to rotor blades of a wind turbine and, more particularly, to pre-cured rotor blade components, such as spar caps, having one or more areas of variable stiffness so as to enhance flexibility thereof.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

Wind turbine rotor blades generally include a body shell formed by two shell halves of a composite laminate material. The shell halves are generally manufactured using molding processes and then coupled together along the corresponding ends of the rotor blade. In general, the body shell is relatively lightweight and has structural properties (e.g., stiffness, buckling resistance and strength) which are not configured to withstand the bending moments and other loads exerted on the rotor blade during operation. In addition, wind turbine blades are becoming increasingly longer in order to produce more power. As a result, the blades must be stiffer and thus heavier so as to mitigate loads on the rotor.

To increase the stiffness, buckling resistance and strength of the rotor blade, the body shell is typically reinforced using one or more structural components (e.g. opposing spar caps with a shear web configured therebetween) that engage the inner surfaces of the shell halves. The spar caps are typically constructed of various materials, including but not limited to glass fiber laminate composites and/or carbon fiber laminate composites. Such materials, however, can be difficult to control, defect prone, and/or highly labor intensive due to handling of the dry and pre-preg fabrics and the challenges of infusing large laminated structures.

As such, modern spar caps may be constructed of pre-fabricated, pre-cured (i.e. pultruded) composites that can be produced in thicker sections, and are less susceptible to defects. Accordingly, the pultruded composites can eliminate various concerns and challenges associated with using dry fabric alone. As used herein, the terms "pultruded composites," "pultrusions," "pultruded members" or similar generally encompass reinforced materials (e.g. fibers or woven or braided strands) that are impregnated with a resin and pulled through a stationary die such that the resin cures or undergoes polymerization through added heat or other curing methods. As such, the process of manufacturing pultruded composites is typically characterized by a continuous process of composite materials that produces composite parts having a constant cross-section. A plurality of pultrusions can then be joined together to form the spar caps and/or various other rotor blade components. The thickness of the pultruded material helps to lower the unit cost of the components by increasing the material throughput of the die. In addition, the die shape is simple (i.e. preferably rectangular) to increase the pull rate of material through the die.

Pultruded components, however, are not without certain drawbacks. For example, the thickness of the pultruded components does not easily conform to the aerodynamic profile of the blade. Further, changing the cross-sectional area of the pultruded component to be flexible can increase complexity of the pultrusion process, thereby slowing down the material manufacturing process.

Accordingly, the art is continuously seeking new and improved methods of manufacturing pultruded or belt-pressed rotor blade components, such as spar caps, having one or more areas of variable stiffness such that the components can conform to various locations of the rotor blade.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a rotor blade component for a wind turbine. The rotor blade component includes a plurality of pre-cured members arranged in one or more layers. Each of the pre-cured members is constructed of a plurality of fiber materials cured together via a resin material having a first stiffness and at least additional material having a second stiffness. Further, the second stiffness is lower than the first stiffness. As such, the additional low-stiffness material is cured within the resin material so as to improve flexibility of the pre-cured members.

In one embodiment, the pre-cured members are formed via a pultrusion process or a belt-pressing process. In another embodiment, the rotor blade component may include a spar cap, a shear web, a root ring, build-up plies near the blade root, or any other suitable rotor blade component.

In further embodiments, the additional low-stiffness material may include a rubber material, a silicon material, a foam material, a flexible glass material, or any other material having a lower stiffness than the resin-cured fiber materials. Further, in certain embodiments, the additional low-stiffness material may include a pre-cured low-stiffness component. In such embodiments, the low-stiffness component may have any suitable cross-sectional shape, including but not limited to, square, arcuate, rectangular, T-shaped, V-shaped, or U-shaped. In additional embodiments, the low-stiffness component may have a solid cross-section. Alternatively, the low-stiffness component may have a hollow cross-section.

In yet another embodiment, the plurality of pre-cured members may be further joined together via vacuum infusion, an adhesive, a pre-preg material, a semi-preg material, or any other suitable joining process. Further, the plurality of fiber materials may include glass fibers, carbon fibers, polymer fibers, ceramic fibers, nanofibers, metal fibers, or similar. In still further embodiments, the resin material may include a thermoplastic material, a thermoset material, or any other suitable resin material.

In another aspect, the present disclosure is directed to a rotor blade of a wind turbine. The rotor blade includes a blade root and a blade tip, a leading edge and a trailing edge, a suction side and a pressure side, and at least one spar cap configured on an internal surface of either or both of the pressure or suction sides. The spar cap is constructed from a plurality of pre-cured members arranged in one or more layers. Each of the pre-cured members includes a plurality of fiber materials cured together via a resin material having a first stiffness and at least additional material having a second stiffness. Further, the additional material is cured within the resin material. In addition, the second stiffness is lower than the first stiffness. As such, the additional low-stiffness material increases flexibility of the pre-cured members. It should be understood that the spar cap may be configured with any of the additional features as described herein.

In yet another aspect, the present disclosure is directed to a method of manufacturing a rotor blade component of a wind turbine. The method includes impregnating a plurality of fiber materials with a resin material. Further, the method includes co-forming the resin-soaked fiber materials having a first stiffness and at least one additional material having a second stiffness into a plurality of pre-cured members. Further, the second stiffness is lower than the first stiffness. The method also includes curing the plurality of pre-cured members. Moreover, the method includes securing the plurality of pre-cured members together to form the rotor blade component, wherein the additional material increases flexibility of the pre-cured members. It should be understood that the method may further include any of the additional steps and/or features as described herein.

In addition, in one embodiment, the step of co-forming the resin-soaked fiber materials and the additional low-stiffness material into the plurality of pre-cured members may include pulling the resin-soaked fiber materials the additional low-stiffness material through a stationary die (e.g. via a pultrusion process) or pressing the resin-soaked fiber materials and the additional low-stiffness material via a belt press (i.e. via a belt pressing process).

In another embodiment, the step of securing the plurality of pre-cured members together to form the rotor blade component may further include joining the pre-cured members together via at least one of vacuum infusion, an adhesive, a pre-preg material, or a semi-preg material.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present subject matter is directed to improved rotor blade components for a wind turbine constructed of one or more pre-cured members having at least one area of variable stiffness and methods of manufacturing same. For example, in one embodiment, the rotor blade component may be a spar cap having one or more flexible hinges or zones of low stiffness material compared to the surrounding materials therein. As such, the low stiffness zone(s) allows the component to conform to the variable geometry of a blade surface while still acting as a larger ply of material. Further, the low stiffness area of the component bends more easily under applied pressure (e.g. under a vacuum bag). It is also possible, once under vacuum pressure that the low stiffness regions crack or yield while flexing to enable conformance of the overall component to the mold surface.

The present disclosure provides many advantages not present in the prior art. For example, thicker, flexible pre-cured members (e.g. pultrusions) can be used in spar-cap production, thereby reducing manufacturing costs. As such, in certain embodiments, the rotor blade components described herein provide a conformable, yet thick pultrusion that can conform to various aerodynamic profiles of the rotor blade. In addition, the rotor blade components of the present disclosure are less prone to defects and have known material properties. Moreover, since the rotor blade components are pre-cured, wrinkling and dis-bonding of the layers are reduced and/or eliminated. Further, because the rotor blade components are designed to a known height as defined by the heated die, the pultruded member thickness tolerance and stack-up can be more tightly controlled, thereby reducing cycle time for the manufacturing process.

Figure 1:
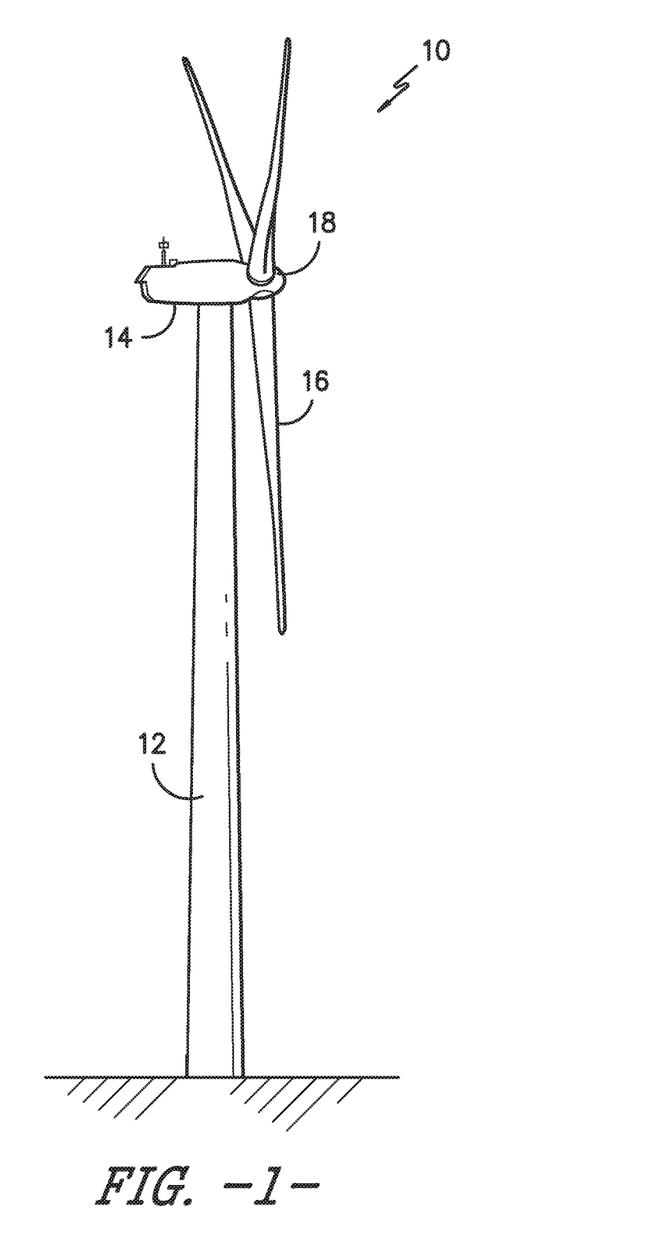
FIG. 1 illustrates a perspective view of one embodiment of a wind turbine according to the present disclosure.

Referring now to the drawings, FIG. 1 illustrates a perspective view of a horizontal axis wind turbine 10. It should be appreciated that the wind turbine 10 may also be a vertical-axis wind turbine. As shown in the illustrated embodiment, the wind turbine 10 includes a tower 12, a nacelle 14 mounted on the tower 12, and a rotor hub 18 that is coupled to the nacelle 14. The tower 12 may be fabricated from tubular steel or other suitable material. The rotor hub 18 includes one or more rotor blades 16 coupled to and extending radially outward from the hub 18. As shown, the rotor hub 18 includes three rotor blades 16. However, in an alternative embodiment, the rotor hub 18 may include more or less than three rotor blades 16. The rotor blades 16 rotate the rotor hub 18 to enable kinetic energy to be transferred from the wind into usable mechanical energy, and subsequently, electrical energy. Specifically, the hub 18 may be rotatably coupled to an electric generator (not illustrated) positioned within the nacelle 14 for production of electrical energy.

Figure 2:
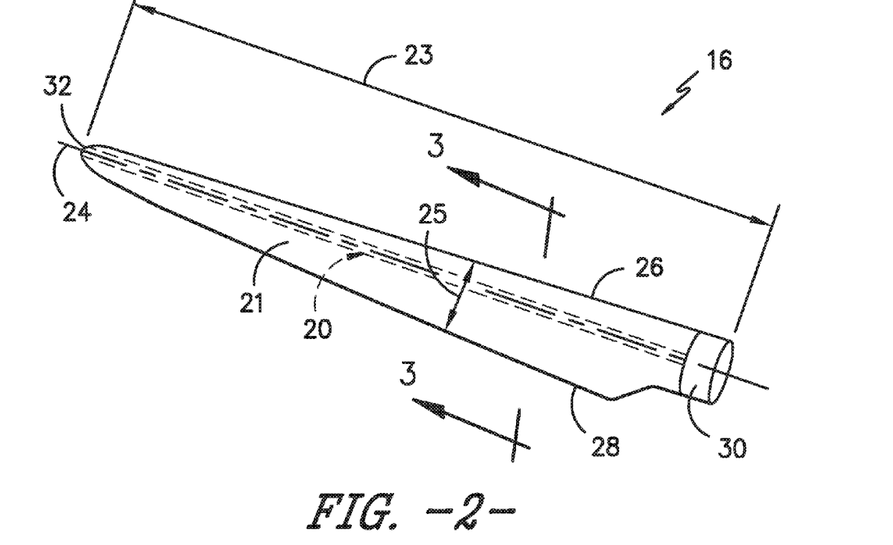
FIG. 2 illustrates a perspective view of one of the rotor blades of FIG. 1.
Figure 3:
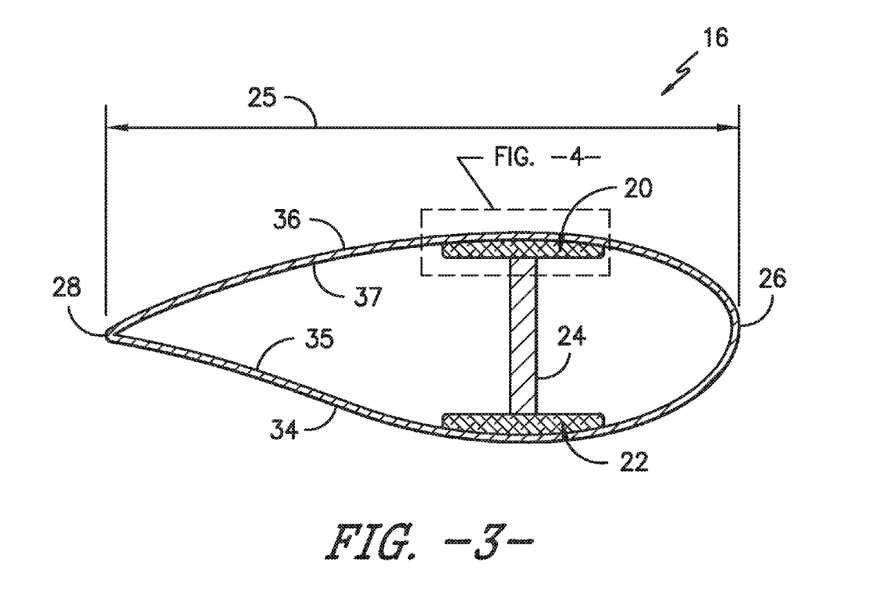
FIG. 3 illustrates a cross-sectional view of the rotor blade of FIG. 2 along line 3-3.

Referring to FIGS. 2 and 3, one of the rotor blades 16 of FIG. 1 is illustrated in accordance with aspects of the present subject matter. In particular, FIG. 2 illustrates a perspective view of the rotor blade 16, whereas FIG. 3 illustrates a cross-sectional view of the rotor blade 16 along the sectional line 3-3 shown in FIG. 2. As shown, the rotor blade 16 generally includes a blade root 30 configured to be mounted or otherwise secured to the hub 18 (FIG. 1) of the wind turbine 10 and a blade tip 32 disposed opposite the blade root 30. A body shell 21 of the rotor blade generally extends between the blade root 30 and the blade tip 32 along a longitudinal axis 27. The body shell 21 may generally serve as the outer casing/covering of the rotor blade 16 and may define a substantially aerodynamic profile, such as by defining a symmetrical or cambered airfoil-shaped cross-section. The body shell 21 may also define a pressure side 34 and a suction side 36 extending between leading and trailing ends 26, 28 of the rotor blade 16. Further, the rotor blade 16 may also have a span 23 defining the total length between the blade root 30 and the blade tip 32 and a chord 25 defining the total length between the leading edge 26 and the trialing edge 28. As is generally understood, the chord 25 may generally vary in length with respect to the span 23 as the rotor blade 16 extends from the blade root 30 to the blade tip 32.

In several embodiments, the body shell 21 of the rotor blade 16 may be formed as a single, unitary component. Alternatively, the body shell 21 may be formed from a plurality of shell components. For example, the body shell 21 may be manufactured from a first shell half generally defining the pressure side 34 of the rotor blade 16 and a second shell half generally defining the suction side 36 of the rotor blade 16, with such shell halves being secured to one another at the leading and trailing ends 26, 28 of the blade 16. Additionally, the body shell 21 may generally be formed from any suitable material. For instance, in one embodiment, the body shell 21 may be formed from a laminate composite material, such as a carbon fiber reinforced laminate composite or a glass fiber reinforced laminate composite. Alternatively, one or more portions of the body shell 21 may be configured as a layered construction and may include a core material, formed from a lightweight material such as wood (e.g., balsa), foam (e.g., extruded polystyrene foam) or a combination of such materials, disposed between layers of laminate composite material.

Referring particularly to FIG. 3, the rotor blade 16 may also include one or more longitudinally extending structural components configured to provide increased stiffness, buckling resistance and/or strength to the rotor blade 16. For example, the rotor blade 16 may include a pair of longitudinally extending spar caps 20, 22 configured to be engaged against the opposing inner surfaces 35, 37 of the pressure and suction sides 34, 36 of the rotor blade 16, respectively. Additionally, one or more shear webs 24 may be disposed between the spar caps 20, 22 so as to form a beam-like configuration. The spar caps 20, 22 may generally be designed to control the bending stresses and/or other loads acting on the rotor blade 16 in a generally spanwise direction (a direction parallel to the span 23 of the rotor blade 16) during operation of a wind turbine 10. Similarly, the spar caps 20, 22 may also be designed to withstand the spanwise compression occurring during operation of the wind turbine 10.

Figure 4:
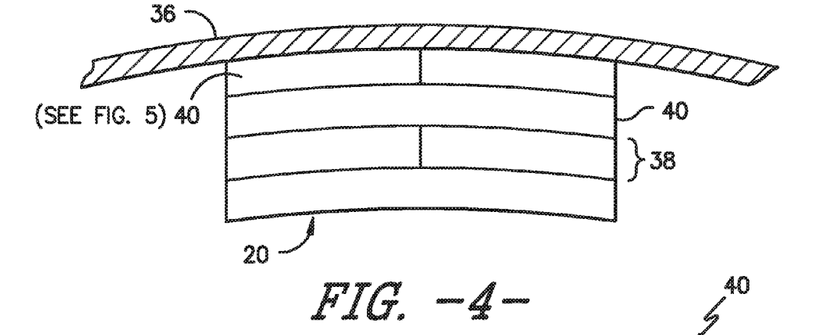
FIG. 4 illustrates a cross-sectional view of one embodiment of a spar cap constructed of a plurality of pre-cured members according to the present disclosure.
Figure 5:
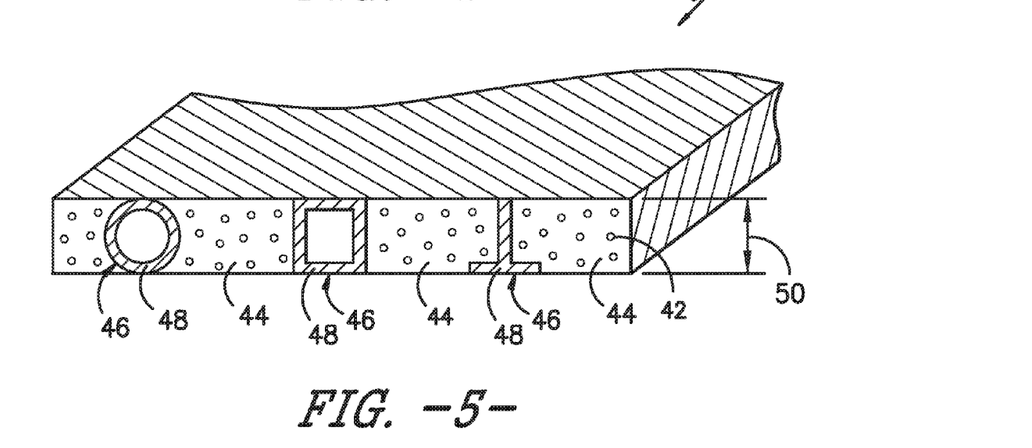
FIG. 5 illustrates a cross-sectional view of one embodiment of one of the pre-cured members according to the present disclosure.
Figure 6:
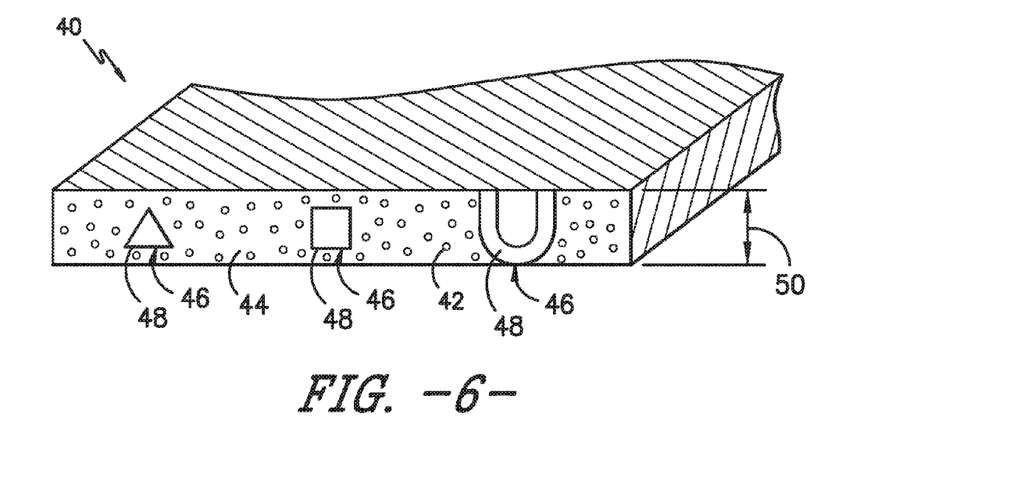
FIG. 6 illustrates a cross-sectional view of another embodiment of one of the pre-cured members according to the present disclosure.

As mentioned, the rotor blade components of the present disclosure may include any suitable rotor blade component such as those described and illustrated herein. For example, the rotor blade components of the present disclosure may include, but are not limited to the spar caps 20, 22, the shear web 24, a root ring, build-up plies near the blade root 30, or any other suitable rotor blade component. For example, as shown in FIGS. 4-5, the rotor blade component corresponds to one of the spar caps 20, which is used in the figures for illustrative purposes only. More specifically, as shown in FIG. 4, a cross-sectional view of the spar cap 20 constructed of a plurality of pre-cured members 40 arranged in layers 38 according to the present disclosure is illustrated. In addition, FIGS. 5 and 6 illustrate detailed, cross-sectional views of various embodiments of pre-cured members 40 of FIG. 4.

It should be understood that the pre-cured members 40 of the present disclosure are pre-fabricated components manufactured using any suitable methods known in the art. For example, in particular embodiments, the pre-cured members 40 may be formed via pultrusion, belt-pressing, or any other suitable forming process. Thus, in accordance with certain aspects of the present disclosure, a plurality of pre-cured members 40 can be then joined together to form the spar cap 20. For example, as shown in FIG. 4, one or more of the pre-cured members 40 may form one or more layers 38 of the spar cap 20. As such, the one or more layers 38 may be stacked and joined and/or secured together, for example, via vacuum infusion, adhesive, semi-preg material, pre-preg material, or any other suitable joining method.

Further, as shown in the illustrated embodiment of FIG. 5, each of the pre-cured members 40 are constructed of a plurality of fibers 42 (e.g. fibers, fiber bundles, and/or woven, braided, or veil fabrics) joined together with a cured resin material 44 having a first stiffness. More specifically, in various embodiments, the fibers 42 may include glass fibers, carbon fibers, polymer fibers, ceramic fibers, nanofibers, metal fibers, or any other suitable fiber materials. Further, in certain embodiments, the resin material 44 may include a thermoplastic material, a thermoset material, or any other suitable resin material.

The thermoplastic materials as described herein generally encompass a plastic material or polymer that is reversible in nature. For example, thermoplastic materials typically become pliable or moldable when heated to a certain temperature and return to a more rigid state upon cooling. Further, thermoplastic materials may include amorphous thermoplastic materials and/or semi-crystalline thermoplastic materials. For example, some amorphous thermoplastic materials may generally include, but are not limited to, styrenes, vinyls, cellulosics, polyesters, acrylics, polysulphones, and/or imides. More specifically, exemplary amorphous thermoplastic materials may include polystyrene, acrylonitrile butadiene styrene (ABS), polymethyl methacrylate (PMMA), glycolised polyethylene terephthalate (PET-G), polycarbonate, polyvinyl acetate, amorphous polyamide, polyvinyl chlorides (PVC), polyvinylidene chloride, polyurethane, or any other suitable amorphous thermoplastic material. In addition, exemplary semi-crystalline thermoplastic materials may generally include, but are not limited to polyolefins, polyamides, fluropolymer, ethyl-methyl acrylate, polyesters, polycarbonates, and/or acetals. More specifically, exemplary semi-crystalline thermoplastic materials may include polybutylene terephthalate (PBT), polyethylene terephthalate (PET), polypropylene, polyphenyl sulfide, polyethylene, polyamide (nylon), polyetherketone, or any other suitable semi-crystalline thermoplastic material. The thermoset materials as described herein generally encompass a plastic material or polymer that is non-reversible in nature. For example, thermoset materials, once cured, cannot be easily remolded or returned to a liquid state. As such, after initial forming, thermoset materials are generally resistant to heat, corrosion, and/or creep. Example thermoset materials may generally include, but are not limited to, some polyesters, some polyurethanes, esters, epoxies, or any other suitable thermoset material.

Referring still to FIG. 5, each of the pre-cured members 40 also includes at least additional low-stiffness material 46, referred to herein as a second stiffness. More specifically, as shown, the additional low-stiffness material 46 is cured within the resin material 44. Further, as mentioned, the second stiffness of the additional material 46 is lower than the first stiffness. As such, the additional material 46 increases flexibility of the pre-cured members 40 such that the pre-cured members 40 can be conformed to one or more of the blade surfaces of the rotor blade 16.

In certain embodiments, the additional low-stiffness material 46 may include a rubber material, a silicon material, a foam material, a flexible glass material, or any other material having a lower stiffness than the resin-cured fiber materials. Further, as shown in FIG. 5, the additional low-stiffness material 46 may include a pre-cured low-stiffness component 48. In such embodiments, the low-stiffness component 48 may have any suitable cross-sectional shape, including but not limited to, square, arcuate, rectangular, triangle, T-shaped, V-shaped, or U-shaped. In addition, as shown with reference to the T-shaped component 48 of FIG. 5, the low-stiffness component 48 may have a solid cross-section. Alternatively, as shown with reference to the circular and square components of FIG. 5, the low-stiffness component 48 may have a hollow cross-section. In addition, the shape of the low-stiffness component 48 may be chosen so as to enhance flexibility of the pre-cured member 40.

Referring particularly to FIGS. 5 and 6, the low-stiffness component 48 of the pre-cured member 40 may extend substantially the thickness 50 of the pre-cured member 40 (FIG. 5) or may be completed embedded within the thickness of the pre-cured member 40 (FIG. 6), i.e. with the resin material configured around the edges thereof. In either embodiment, the low-stiffness component 48 is configured to increase the flexibility of the pre-cured member 40 at the area around the low-stiffness component 48. As such, any number of low-stiffness components 48 and/or areas of low-stiffness materials 46 can be included in the pre-cured member 40 so as to enhance the flexibility thereof.

As mentioned, it should also be understood that the pre-cured members 40 as described herein may be used to construct various other rotor blade components, in addition to the spar cap 20. For example, in certain embodiments, the pre-cured members 40 may be used to construct the shear web 24, a root ring, or any other rotor blade component that can benefit from being constructed of a pre-cured parts as described herein.

Figure 7:
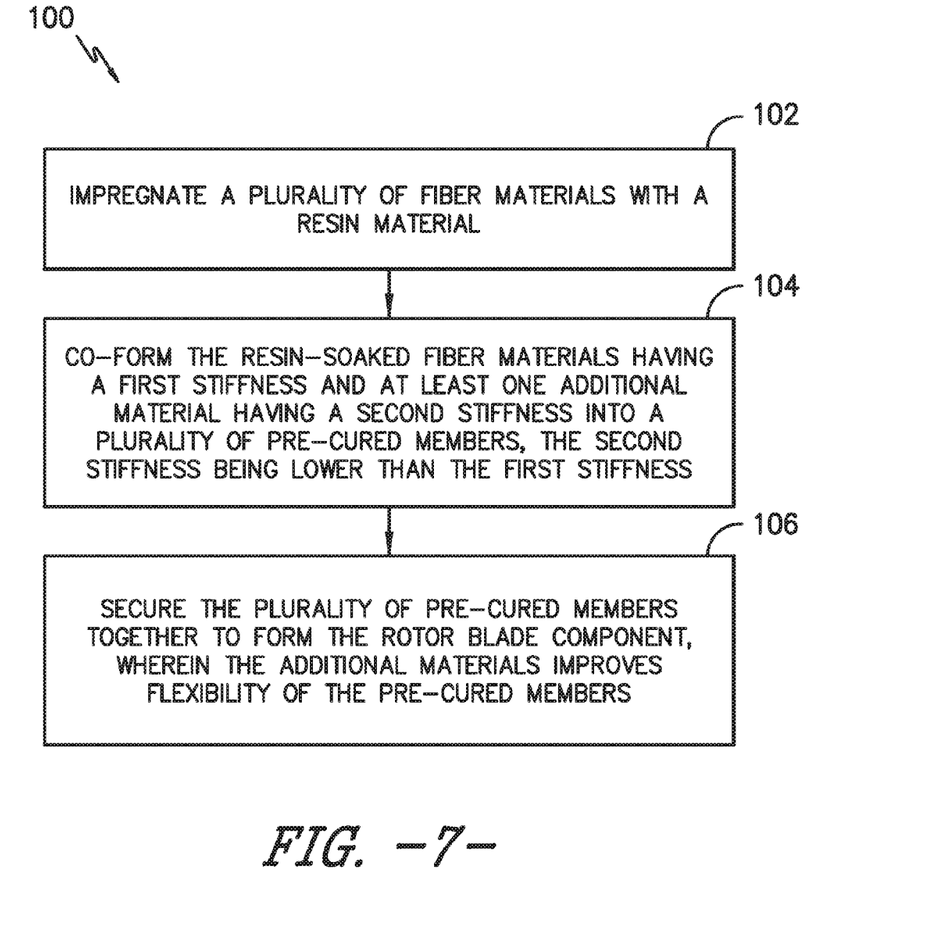
FIG. 7 illustrates a flow diagram of a method of manufacturing rotor blade components according to the present disclosure.

The present disclosure is also directed to methods for manufacturing rotor blade components, e.g. using the pre-cured members 40 as described herein. For example, as shown in FIG. 7, a flow diagram of one embodiment of a method 100 for manufacturing a rotor blade component of a wind turbine, e.g. such as the wind turbine 10 of FIG. 1, is illustrated. As shown at 102, the method 100 includes impregnating a plurality of fiber materials 42 with a resin material 44. As shown at 104, the method 100 includes co-forming the resin-soaked fiber materials having a first stiffness and at least one additional material 46 having a second, lower stiffness into a plurality of pre-cured members 40. More specifically, in one embodiment, the step of co-forming the resin-soaked fiber materials and the additional low-stiffness material 46 into the plurality of pre-cured members 40 may include pulling the resin-soaked fiber materials the additional material through a stationary die (e.g. via a pultrusion process). Alternatively, the step of co-forming the resin-soaked fiber materials and the additional low-stiffness material 46 into the plurality of pre-cured members 40 may include pressing the resin-soaked fiber materials and the additional low-stiffness material via a belt press (i.e. via a belt pressing process). In additional embodiments, the additional low-stiffness material 46 may bypass the resin bath and may be directly co-pultruded or co-pressed with the resin-soaked fiber materials.

The method 100 may also include curing the plurality of members 40 after the co-forming step. Further, as shown at 106, the method 100 includes securing the plurality of pre-cured members 40 together to form the rotor blade component, wherein the additional low-stiffness material 46 increases flexibility of the pre-cured members 40. More specifically, in certain embodiments, the step of securing the plurality of pre-cured members 40 together to form the rotor blade component may further include joining the pre-cured members together via at least one of vacuum infusion, an adhesive, a pre-preg material, a semi-preg material, or any other suitable joining process.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade component for a wind turbine, the rotor blade component comprising:
    a plurality of pre-cured members arranged in one or more layers, each of the pre-cured members comprising:
        a plurality of fiber materials cured together via a resin material having a first stiffness; and,
        at least one additional material cured within the resin material and having a second stiffness, the second stiffness being lower than the first stiffness,
        wherein the additional material increases flexibility of the pre-cured members.

2. The rotor blade component of claim 1, wherein the pre-cured members are formed via at least one of pultrusion or belt-pressing.

3. The rotor blade component of claim 1, wherein the rotor blade component comprises at least one of a spar cap, a shear web, or a root ring.

4. The rotor blade component of claim 1, wherein the additional material comprises at least one of a rubber material, a silicon material, a foam material, or a flexible glass material.

5. The rotor blade component of claim 1, wherein the additional material comprises a pre-cured low-stiffness component.

6. The rotor blade component of claim 5, wherein the low-stiffness component comprises at least one of the following cross-sectional shapes: square, arcuate, rectangular, T-shaped, V-shaped, or U-shaped.

7. The rotor blade component of claim 1, wherein the low-stiffness component comprises a solid cross-section.

8. The rotor blade component of claim 1, wherein the low-stiffness component comprises a hollow cross-section.

9. The rotor blade component of claim 1, wherein the plurality of pre-cured members are further joined together via at least one of vacuum infusion, an adhesive, a pre-preg material, or a semi-preg material.

10. The rotor blade component of claim 1, wherein the plurality of fiber materials comprises at least one of glass fibers, carbon fibers, polymer fibers, ceramic fibers, nano-fibers, or metal fibers.

11. The rotor blade component of claim 1, wherein the resin material further comprises at least one of a thermoplastic material or a thermoset material.

12. A rotor blade of a wind turbine, the rotor blade comprising:
   a blade root and a blade tip;
   a leading edge and a trailing edge;
   a suction side and a pressure side; and,
   at least one spar cap configured on an internal surface of either or both of the pressure or suction sides, the at least one spar cap constructed from a plurality of pre-cured members arranged in one or more layers, each of the pre-cured members comprising a plurality of fiber materials cured together via a resin material having a first stiffness and at least additional material cured within the resin material and having a second stiffness, the second stiffness being lower than the first stiffness, wherein the additional material increases flexibility of the pre-cured members.

13. The rotor blade of claim 12, wherein the pre-cured members are formed via at least one of pultrusion or belt-pressing.

14. The rotor blade of claim 12, wherein the additional material comprises at least one of a rubber material, a silicon material, a foam material, or a flexible glass material.

15. The rotor blade of claim 12, wherein the additional material comprises a pre-cured low-stiffness component, the low-stiffness component comprising at least one of the following cross-sectional shapes: square, arcuate, rectangular, T-shaped, V-shaped, or U-shaped.

16. The rotor blade of claim 12, wherein the plurality of pre-cured members are further joined together via at least one of vacuum infusion, an adhesive, a pre-preg material, or a semi-preg material.

* * * * *